United States Patent
Rieker et al.

(10) Patent No.: US 6,339,749 B1
(45) Date of Patent: Jan. 15, 2002

(54) DEVICE FOR DETERMINING THE WEIGHT OF A MOTOR VEHICLE

(75) Inventors: Heinz Rieker, Waldenbuch; Paul Schuetzner, Esslingen; Josef Stoll, Remseck, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/236,224

(22) Filed: Jan. 25, 1999

(30) Foreign Application Priority Data

Jan. 24, 1998 (DE) .......................................... 198 02 630

(51) Int. Cl.⁷ ............................................. G01G 19/00
(52) U.S. Cl. ............................. 702/173; 701/70; 701/90
(58) Field of Search ................................. 702/173, 175, 702/176; 701/70, 80, 84, 90; 177/1–2, 136

(56) References Cited

U.S. PATENT DOCUMENTS

| | | | | |
|---|---|---|---|---|
| 5,033,002 A | * | 7/1991 | Sol | 701/90 |
| 5,610,372 A | * | 3/1997 | Phillips et al. | 702/173 |
| 5,925,087 A | * | 7/1999 | Ohnishi et al. | 701/70 |

FOREIGN PATENT DOCUMENTS

| | | |
|---|---|---|
| DE | 33 42 553 C2 | 6/1985 |
| DE | 38 43 818 C1 | 12/1988 |
| DE | 39 41 702 A1 | 6/1991 |
| DE | 41 38 822 A1 | 5/1992 |
| DE | 42 28 413 A1 | 3/1994 |
| DE | 196 12 222 A1 | 10/1996 |
| EP | 0 111 636 A2 | 6/1984 |
| EP | 0 142 633 A1 | 8/1984 |
| EP | WO 93/18375 | 9/1993 |
| EP | 0 666 435 A2 | 8/1995 |

* cited by examiner

Primary Examiner—Patrick Assouad
Assistant Examiner—Bryan Bui
(74) Attorney, Agent, or Firm—Crowell & Moring LLP

(57) ABSTRACT

In a device for determining the weight of a motor vehicle which is being moved by propulsive forces in its longitudinal direction, signals which correlate with a propulsive force and with a corresponding vehicle longitudinal acceleration are recorded with the aid of a sensing system during successive time intervals. Signals recorded at at least two points in time are used by a computer to produce a signal which correlates to the vehicle's weight. To enhance the device's accuracy, signals for the propulsive force and for the corresponding vehicle longitudinal acceleration are detected at successive points in time which follow one another at constant time intervals. The signals in a memory are stored, where they form a time sequence for the propulsive forces and the corresponding vehicle longitudinal accelerations. A plurality of successive stored signals of the time sequence are read from the memory and used to generate the signals that correlate to the current weight of the vehicle.

14 Claims, 1 Drawing Sheet

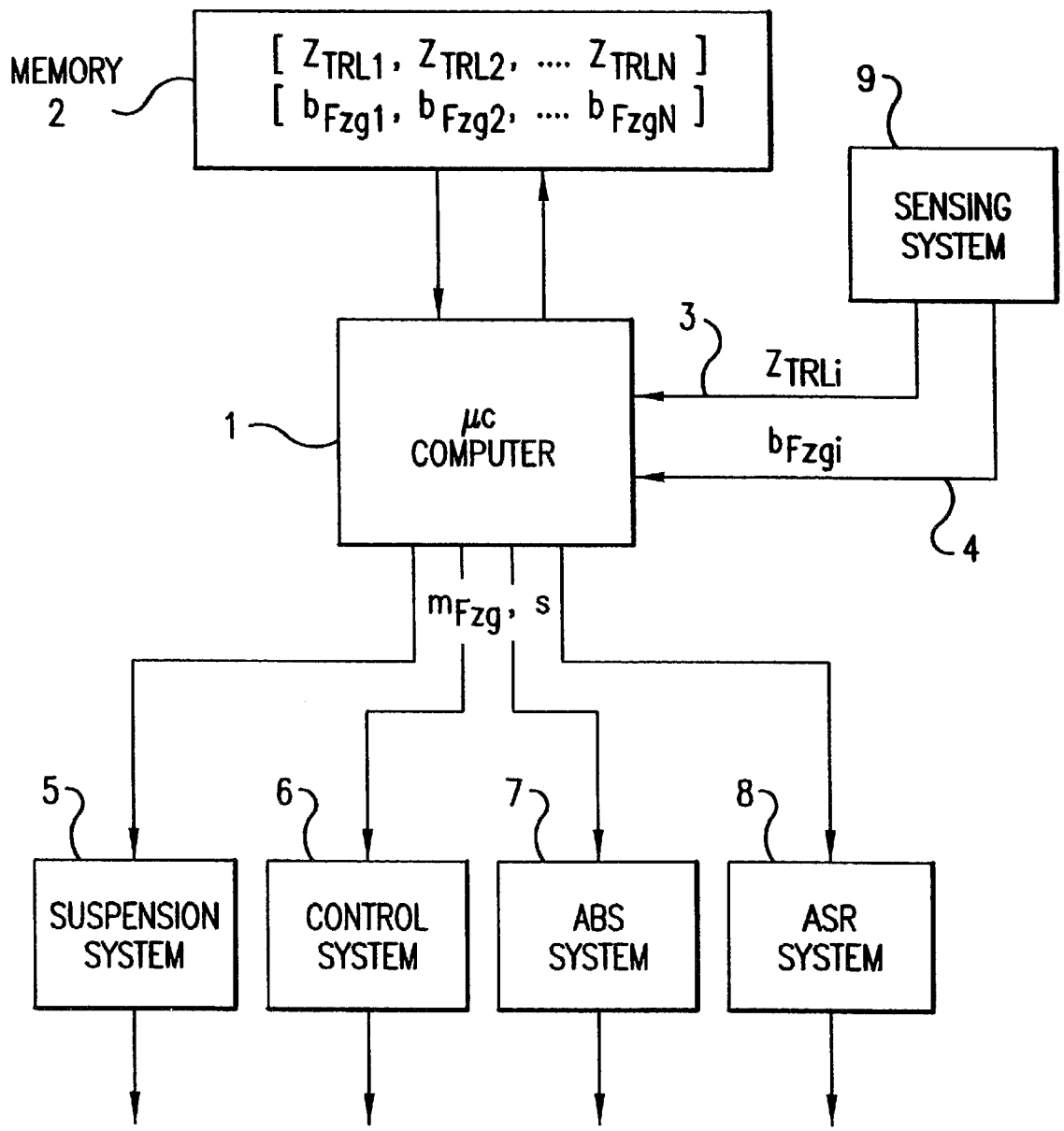

DEVICE FOR DETERMINING THE WEIGHT OF A MOTOR VEHICLE

BACKGROUND AND SUMMARY OF THE INVENTION

This application claims the priority of German application no. 198 02 630.7, filed Jan. 24, 1998, the disclosure of which is expressly incorporated by reference herein.

The invention relates to a device for determining the weight of a motor vehicle which is being moved in its longitudinal direction by propulsive forces.

Knowledge of the current values of the weight of the vehicle and grade of the road are of considerable importance for optimizing the function of a plurality of regulating and/or control devices which influence various vehicle subsystems. Such vehicle subsystems (in which the weight of the vehicle and/or road grade form a regulating and/or control parameter) include, for example, a speed regulating system and a driving dynamics regulating strategy, such as ABS (anti-lock braking systems), for example. Such vehicle systems may also include ASR (anti-slip regulating) systems, a rear-wheel steering system, a front-wheel steering system, systems for adjusting the optimum tire pressure, a transmission control with various shift strategies and a suspension system, for example.

During downhill travel, these systems are particularly important in trucks having a trailer or semitrailer for preventing disadvantageous effects, for example, on the steering behavior of the tractor when the tractor is pushed by the trailer or semitrailer.

In buses, knowledge of the current total weight of the vehicle is also of great importance for optimizing the drive, suspension and brake systems, since the weight of the vehicle can change considerably at each bus stop. Articulated buses with rear drive require data regarding the weight of the vehicle for controlling and/or regulating damping members in the articulation area, in order to prevent the rear of the vehicle from breaking loose.

In a device disclosed in German patent document DE-OS 42 28 413 A1, the weight of the vehicle is determined by detecting at least two longitudinal accelerations at at least two different points in time and detecting the propulsive forces which exist at these points in time. The weight of the vehicle is then determined from the difference between the propulsive forces and the difference between the longitudinal accelerations. The accuracy of this disclosed method requires a significant difference to exist between the two acceleration values measured in succession. Additionally, the driving resistances such as the air-resistance, rolling resistance and descending force, for example, must not have changed significantly between the successive points in time. An increase in the accuracy of this method is sought by repeating the determination of the weight of the vehicle, with each increase in the acceleration of the vehicle.

German patent document DE 38 43 818 C1 discloses a device for determining an average value of the weight of a motor vehicle. The determination of a relatively accurate value of the weight of the vehicle is performed by determining the driving resistance of the vehicle while the clutch is disengaged from the drive train and by repeatedly determining (by averaging) the engine torque and simultaneously repeatedly measuring (by averaging) the acceleration of the vehicle with the clutch engaged, as well as by taking into account the transmission ratio of the transmission. In order to successfully determine the weight of the vehicle with this device, a shifting process is necessary. Hence, when shifts during trips which last a long time do not occur, the weight of the vehicle cannot be updated.

EP 0 111 636 A2 discloses a device for determining the weight of a vehicle. Here, the weight is determined based on the knowledge that the driving torque of a vehicle engine is determined by multiplying the vehicle weight by the vehicle acceleration and adding the resistance moments that oppose the forward movement of the vehicle. When the resistance moments, vehicle acceleration and drive torque are measured at different points in time, two equations can be produced which can be solved for the vehicle weight. In order to successfully calculate a usable value of the weight of the vehicle from this equation, a sufficient difference between the drive torques must be measured. This device teaches the selection of one measuring point in time while the vehicle is in a drive-less state. Such a drive-less state exists when the drive train is disconnected from the engine, for example, when a gear shift occurs.

WO 93/18 375 A1 discloses another device for determining the weight of a vehicle. Here, two operating states of the vehicle are compared with one another. During each of these driving states, a series of successive pulses is determined. By integrating these pulses, an average value is obtained for the change in momentum that takes place in each of the operating states. From the changes in momentum of the two operating states, the weight of the vehicle is then determined, but on the assumption that the vehicle is traveling on a horizontal road. This calculation method is especially suitable for calculating the weight of ships.

It is therefore an object of the present invention to provide a device for determining the weight of a vehicle which is being moved in its longitudinal direction by propulsive forces such that during travel, highly accurate values for the weight of the vehicle and grade of the road can be obtained as simply as possible.

This and other objects and advantages are achieved by the device according to the invention, in which signals which correspond to the propulsive force and the corresponding vehicle longitudinal acceleration are recorded continuously and stored in time sequences, for example, in a memory. To produce a signal that corresponds to the current vehicle weight, a certain number of successive elements or values in this series are used for the signals of the propulsive forces, and the corresponding values from the time sequence are used for the signals of the vehicle longitudinal accelerations. In this manner, a continuously updated signal which correlates with the weight of the vehicle is available for optimizing the regulating and/or control systems of the vehicle. This enables these systems to react especially rapidly to changes in the weight of the vehicle.

In addition, with the knowledge of the current weight of the vehicle, the current values for the propulsive force and the vehicle longitudinal acceleration, a signal can be generated which represents the current grade of the road.

The present invention is based on the knowledge that to determine the weight of the vehicle and grade of the road, only the propulsive force $Z_{TRL}$ acting on the vehicle, the corresponding vehicle longitudinal acceleration $b_{Fzg}$ and the corresponding descending force $Z_{HA}$ are required. The initial situation is formed by the generally known relationship:

$$Z_{TRLi}=m_{Fzg}*b_{Fzi}+Z_{HA}.$$

The propulsive force $Z_{TRL}$ is composed of the driving or braking force $Z_T$ acting on the vehicle minus the rolling resistance $Z_R$ and minus the air resistance $Z_L$:

$$Z_{TRL}=Z_T-Z_R-Z_L.$$

The propulsive force $Z_{TRL}$ of the vehicle can be determined, for example, from the engine torque, transmission ratio, axle ratio and the wheel radius. This is true if, for example, the engine torque is stored in the form of measured characteristic maps as a function of certain engine parameters such as pedal position, rpm, etc. The engine torque is already available in vehicles in a plurality of engine controls that are now conventional. The longitudinal acceleration of the vehicle can be calculated, for example, from the wheel rpm in conjunction with the wheel radius, with a distance traveled in a unit time being derived twice as a function of time. The values required for this purpose are provided, for example, by an ABS and/or ASR system and thus are available in many contemporary vehicles.

The terms which are provided with subscript i are the values that are detected in sequence and stored in the time sequences. When the time interval $\Delta t$ between the successive points in time $t_i$ in which these values are detected for the time sequences is sufficiently short, the vehicle weight $m_{Fzg}$ and the descending force $Z_{HA}$ can be considered constant during this time interval $\Delta t$.

In an embodiment, with the aid of a number N of successive values of the time sequences with the aid of a regression calculation method according to the equation:

$$m_{Fzg} = \frac{S_{bz} - S_z * S_b / N}{S_{bb} - S_b * S_b / N}$$

a signal $m_{Fzg}$ that correlates with the vehicle weight is produced. In this equation, the following sum terms are used:

$$S_b = \sum_{i=1}^{N} b_{Fzgi}$$

$$S_z = \sum_{i=1}^{N} Z_{TRLi}$$

$$S_{bb} = \sum_{i=1}^{N} b_{Fzgi} * b_{Fzgi}$$

$$S_{bz} = \sum_{i=1}^{N} b_{Fzgi} * Z_{TRLi}$$

If the vehicle's weight $m_{Fzg}$ is known, the grade s or the slope of the road in the longitudinal direction can be determined. This is based on the following relationship:

$$Z_{HAi} = Z_{TRLi} - M_{Fzg} * b_{Fzgi - mFzg} * g * \sin(s_i),$$

where g is the acceleration due to gravity. At point in time $t_i$, the current road grade $s_i$ is present.

In a preferred embodiment, the signals $s_i$ produced in succession for the road grade can be smoothed with the aid of a low-pass filter method that allows the elimination of disturbing scatters.

The accuracy of the available signals $Z_{TRLi}$ and the signals $b_{Fzgi}$ for the corresponding vehicle longitudinal acceleration, as well as the regression calculation method used, are of great significance for the acceptability of the signals $m_{Fzg}$ which are produced for the vehicle's weight and hence also of the signals $s_i$ for the grade of the road.

According to one advantageous embodiment of the device according to the invention, the sum terms $S_b$, $S_z$, $S_{bb}$, $S_{bz}$ required for producing the signals $m_{Fzg}$ which correlate to the vehicle's weight are determined with the aid of a ring memory method. This method is notable for its low calculation times and minimum memory requirements. In the ring memory method, the current sums are formed at each point in time $t_i$ such that (in each case) the oldest element in the individual time sequence is subtracted from the previous sum to produce an intermediate sum, and the newest or youngest element in this sequence (in each case) is added to this intermediate sum to produce the current sum. The oldest value in each case is then overwritten in the memory by the youngest value added.

With the aid of the proposed regression calculation method, the currently valid vehicle's weight $m_{Fzg}$ in each case and/or a signal correlated therewith is constantly updated- The current road grade $s_i$ or the signal correlated therewith is determined with the aid of the value $m_{Fzg}$ for the currently valid vehicle's weight and a current value $Z_{HAi}$ for the descending force, and is additionally subjected to low-pass filtration.

Before a signal $m_{Fzg}$ produced in this fashion and correlated with the vehicle's weight is evaluated or accepted in another vehicle system (for example, the brake system), it can be investigated in accordance with an improvement on the device according to the invention with the aid of an acceptance test for its trustworthiness and plausibility. Preferably, the scatter of the abscissa values $\sigma_b$ can be used for the purpose, which is calculated as follows:

$$\sigma_b^2 = S_{bb}/N - (S_b/N)^2.$$

The greater the scatter of the abscissa values $\sigma_b$ calculated in this manner, the more trustworthy the signal $m_{Fzg}$ corresponding to the weight of the vehicle will be. A predetermined limiting value can be provided as the exclusion criterion for the signal $m_{Fzg}$ under investigation. Here, the limiting value must be exceeded by the abscissa value scatter in order for an evaluation of the signal in question to be allowed for the vehicle weight $m_{Fzg}$.

In addition to or alternatively thereto, according to an embodiment of the device according to the invention, the correlation coefficient R can be used in the plausibility test. It is calculated as follows:

$$R^2 = \frac{(S_{bz} - S_b * S_z / N)^2}{(S_{bb} - S_b * S_b / N) * (S_{zz} - S_z * S_z / N)}$$

Provision can also be made for the correlation coefficient R such that an evaluation of the investigated signal $m_{Fzg}$ that corresponds to the vehicle weight can only be performed if R exceeds a certain limiting value. This limiting value can be calculated especially dynamically from the previous calculations of the signals $m_{Fzg}$ which correlate with the vehicle's weight. For example, vibrations in the drive train deteriorate the correlation coefficient R that has been calculated. For the case in which these vibrations in the drive train, by comparison with the component of the signals related to driving dynamics, are too great for the propulsive forces $Z_{TRLi}$ and the corresponding vehicle longitudinal accelerations $b_{Fzgi}$, this acceptance criterion, i.e., the limiting value for the correlation coefficient R ensures that the affected signal for the vehicle weight $m_{Fzg}$ remains out of consideration or is not evaluated.

If both the correlation coefficient R and the scatter of the abscissa values $\sigma_b$ are used as acceptance criteria, preferably a weighting factor is obtained from these two values which, with a weighted average value for the generated individual signals for the vehicle's weight $m_{Fzg}$, takes into account the trustworthiness or quality of the individual results. It is only this weighted average that is made available as a signal which can be accepted or evaluated for the vehicle's weight $m_{Fzg}$ to the dynamic vehicle systems that are communicating (in each case) with the device according to the invention.

For a reliable determination of the propulsive force $Z_{TRL}$ from the individual forces, namely the driving or braking force $Z_T$, the rolling resistance $Z_R$, and the air resistance $Z_L$, various losses and system-immanent effects must be taken into account. For example, if the braking force $Z_T$ produced by the vehicle brake cannot be determined unambiguously, the regression calculation for the weight of the vehicle is postponed (preferably until actuation of the brakes stops). Furthermore, consideration must be given to the fact that the actual weight of the vehicle differs from the effective weight of the vehicle to be taken into account. This is because certain partial weights of the vehicle that rotate as a function of the vehicle speed have a greater inertia in the lengthwise direction of the vehicle. As a result of this, the effective weight of the vehicle is higher than the actual weight of the vehicle weight.

In the same way, taking into account the inertial effect of the engine, an effective propulsive force is obtained for the vehicle which differs from the driving force applied by the engine. In addition, transmission losses which occur between the various assemblies in the drive train (differential, transmission, and the like) must also be taken into account, so that the effective propulsive force when the engine is pulling is reduced and increased when the engine is overrun. When the rolling resistances and air resistances $Z_R$ and $Z_L$ are taken into account, empirically determined functions can be used. For the case in which the rolling and air resistance forces $Z_R$ and $Z_L$ are not taken into account or are made equal to zero, a signal $s_i$ is produced for the grade to determine the road grade that corresponds to an effective driving resistance. The resultant deviation of the road grade that corresponds to the generated signal $s_i$ from the actual grade is less than 1% as a rule.

The number N of values in the time sequences for the determination of a signal corresponding to the vehicle's weight $m_{Fzg}$ and consequently of a signal corresponding to the grade of the road $s_i$, must be chosen for the proposed regression calculation method in accordance with a preferred embodiment of the device according to the invention. This must occur in a manner such that with consideration of the constant time interval $\Delta t$ between two successive values of the time sequences, an overall time interval is obtained which is longer than one oscillation period of the oscillation that occurs in the drive train, which has the lowest frequency. In this manner, the fluctuations in the driving force $Z_T$ and the vehicle acceleration $b_{FZg}$ which are caused by vibrations in the drive train can offset one another so that they do not falsify the results for the vehicle weight $m_{Fzg}$ and the road grades.

Other objects, advantages and novel features of the present invention will become apparent from the following detailed description of the invention when considered in conjunction with the accompanying drawings.

BRIEF DESCRIPTION OF THE DRAWINGS

The sole FIGURE is a schematic block diagram of the device according to the invention.

DETAILED DESCRIPTION OF THE DRAWINGS

The device according to the invention essentially consists of a computer 1 and a memory 2. The device also has a sensing system 9 that supplies signals $Z_{TRL}$ which correlate with the propulsive force through a data line 3, and signals $b_{Fzg}$ that correlate with the longitudinal acceleration through another data line 4 to computer 1. A sensing system can also consist of a pre-existing sensing system which supplies other dynamic vehicle subsystems (for example, a transmission control or an ABS system) with the corresponding signals. Data transmission to computer 1 of the device according to the invention can then take place, in particular through an interface with the respective other vehicle systems.

The signal values supplied to computer 1 are set aside or stored in memory 2 in a first time sequence ($Z_{TRL1}$, $Z_{TRL2}$, ..., $Z_{TRLN}$) for the propulsive force $Z_{TRL}$, and in a second time sequence ($b_{Fzg1}$, $b_{Fzg2}$, ..., $b_{FzgN}$) for the vehicle longitudinal accelerations $b_{Fzg}$. In addition, more data that can be called up can be stored in memory 2 for example, the data of an engine characteristic. This can occur if, for example, instead of the propulsive force $Z_{TRLi}$, only a driving torque can be supplied to computer 1 through data line 3.

The data and/or measured values for the signals $Z_{TRL}$ and $b_{Fzg}$ that correspond to the propulsive force and the vehicle longitudinal acceleration are continuously recorded with a constant time interval $\Delta t$ and supplied to computer 1, or called up from computer 1 at the corresponding sensors of the sensing system.

With the aid of the previously described regression calculation method, a signal $\bar{m}_{Fzg}$ that correlates with the actual vehicle weight is produced from a number N of values from the time sequence for the propulsive force $Z_{TRL}$ and the corresponding values of the time sequence for the longitudinal acceleration $b_{Fzg}$ of the vehicle by computer 1 for the longitudinal acceleration $b_{Fzg}$ of the vehicle. The value determined for the vehicle weight $m_{Fzg}$ is then preferably tested for plausibility via various acceptance criteria, with the corresponding limiting values and comparison values each being stored in memory 2. Following a successful check of the values determined, a signal s that correlates with the current road grade is produced by computer 1.

The device according to the invention can preferably be connected by corresponding interfaces to other dynamic vehicle subsystems, to which the signals for the respective current values of the vehicle weight $m_{Fzg}$ and the road grade s can thus be made available. In the exemplary embodiment, on the device or on computer 1, a suspension system 5, a control system 6 for an automatic transmission, an ABS system 7, and an ASR system 8 can be connected which as a result can always take into account the current values of the vehicle weight and/or the road grade within their regulating and/or control function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for determining a weight of a motor vehicle which is being moved by propulsive forces in its longitudinal direction, comprising:

a microprocessor;

a memory coupled to the microprocessor; and a sensing system coupled to the microprocessor; wherein the microprocessor has stored therein a program for causing the system continuously to detect, at successive points in time separated by regular periodic time intervals, measurement signals which correlate with said propulsive forces and with an associated vehicle longitudinal acceleration;

storing successively in the memory a first plurality of continuously detected measurement signals, said first plurality of signal forming in the memory a first time sequence for successive propulsive forces and a second time sequence for associated vehicle longitudinal accelerations;

reading out of said memory a second plurality of successively stored measurement signals from said first and second time sequences; and computing an output signal that correlates with a current weight of the vehicle based on said second plurality of successively stored measurement signals; wherein the microprocessor processes the second plurality of successively stored measurement signals read from the memory according to a regression calculation to generate said output signal; and the output signal for the current weight of the vehicle is a value calculated according to the equation $$m_{Fzg} = \frac{S_{bz} - S_z * S_b[-S_b]/N)}{S_{bb} - S_b * S_b/N},$$

with $$S_b = \sum_{i=1}^{N} b_{Fzgi}, S_z = \sum_{i=1}^{N} Z_{TRLi}, S_{bb} = \sum_{i=1}^{N} b_{Fzgi} \cdot b_{Fzgi} \text{ and}$$

$$S_{bz} = \sum_{i=1}^{N} b_{Fzgi} \cdot Z_{TRLi},$$

$Z_{TRLi}$ being a value from the first time sequence, and $b_{Fzgi}$ being a value from the second time sequence.

2. The device according to claim 1, wherein a ring memory system is used to generate sum terms in which a current sum is reduced by an oldest summand from a respective time sequence and is increased by a youngest summand from the respective time sequence.

3. The device according to claim 1, wherein the continuously recorded signals correlate with the propulsive force which is formed from a pulling or braking force acting on the vehicle, minus a rolling resistance and minus an air resistance.

4. A device for determining a weight of a motor vehicle which is being moved by propulsive forces in its longitudinal direction, comprising:

a microprocessor;

a memory coupled to the microprocessor; and a sensing system coupled to the microprocessor; wherein the microprocessor has stored therein a program for causing the system continuously to detect, at successive points in time separated by regular periodic time intervals, measurement signals which correlate with said propulsive forces and with an associated vehicle longitudinal acceleration;

storing successively in the memory a first plurality of continuously detected measurement signals, said first plurality of signal forming in the memory a first time sequence for successive propulsive forces and a second time sequence for associated vehicle longitudinal accelerations;

reading out of said memory a second plurality of successively stored measurement signals from said first and second time sequences; and computing an output signal that correlates with a current weight of the vehicle based on said second plurality of successively stored measurement signals; wherein the microprocessor processes the second plurality of successively stored measurement signals read from the memory according to a regression calculation to generate said output signal; and a number of values in the first and second time sequences used for determining the output signal is selected such that a product of the number of values and the constant time interval between successive points in time produces a calculated time period which is longer than an oscillation period of an oscillation which has a lowest frequency in a drive train of the motor vehicle.

5. A device for determining a weight of a motor vehicle which is being moved by propulsive forces in its longitudinal direction, comprising:

a microprocessor;

a memory coupled to the microprocessor; and a sensing system coupled to the microprocessor; wherein the microprocessor has stored therein a program for causing the system continuously to detect, at successive points in time separated by regular periodic time intervals, measurement signals which correlate with said propulsive forces and with an associated vehicle longitudinal acceleration;

storing successively in the memory a first plurality of continuously detected measurement signals, said first plurality of signal forming in the memory a first time sequence for successive propulsive forces and a second time sequence for associated vehicle longitudinal accelerations;

reading out of said memory a second plurality of successively stored measurement signals from said first and second time sequences; and computing an output signal that correlates with a current weight of the vehicle based on said second plurality of successively stored measurement signals; wherein the microprocessor processes the second plurality of successively stored measurement signals read from the memory according to a regression calculation to generate said output signal;

the continuously recorded signals correlate with the propulsive force which is formed from a pulling or braking force acting on the vehicle, minus a rolling resistance and minus an air resistance; and a number of values in the first and second time sequences used for determining the output signal is selected such that a product of the number of values and the constant time interval between successive points in time produces a calculated time period which is longer than an oscillation period of an oscillation which has a lowest frequency in a drive train of the motor vehicle.

6. A device for determining a weight of a motor vehicle which is being moved by propulsive forces in its longitudinal direction, comprising:

a microprocessor;

a memory coupled to the microprocessor; and a sensing system coupled to the microprocessor; wherein the microprocessor has stored therein a program for causing the system continuously to detect, at successive points in time separated by regular periodic time intervals, measurement signals which correlate with said propulsive forces and with an associated vehicle longitudinal acceleration;

storing successively in the memory a first plurality of continuously detected measurement signals, said first plurality of signal forming in the memory a first time sequence for successive propulsive forces and a second time sequence for associated vehicle longitudinal accelerations;

reading out of said memory a second plurality of successively stored measurement signals from said first and second time sequences; and computing an output signal that correlates with a current weight of the vehicle based on said second plurality of successively stored measurement signals; wherein the microprocessor processes the second plurality of successively stored measurement signals read from the memory according to a regression calculation to generate said output signal; and prior to an evaluation of the output signal, the output signal is subjected to an acceptance test.

7. The device according to claim 6, wherein the acceptance test comprises a scatter of abscissa values which represent a value calculated according to an equation $$\sigma_b^2 = S_{bb}/N - (S_b/N)^2,$$

and an acceptance of the output signal increases with the scatter of abscissa values.

8. The device according to claim 7, wherein a limiting value for the scatter of abscissa values is stored in the memory, and the evaluation of the output signal which correlates with the vehicle weight does not occur when the scatter of abscissa values is less than the limiting value.

9. The device according to claim 8, wherein the acceptance test comprises monitoring a correlation coefficient, said correlation coefficient representing a value calculated according to an equation $$R^2 = \frac{(S_{bz} - S_b * S_z/N)^2}{(S_{bb} - S_b * S_b/N) * (S_{zz} - S_z * S_z/N)}$$

wherein $$S_b = \sum_{i=1}^{N} b_{Fzgi}, \quad S_z = \sum_{i=1}^{N} Z_{TRLi}, \quad S_{bb} = \sum_{i=1}^{N} b_{Fzgi} * b_{Fzgi}$$

$$S_{zz} = \sum_{i=1}^{N} Z_{TRLi} * Z_{TRLi}, \quad S_{bz} = \sum_{i=1}^{N} b_{Fzgi} * Z_{TRLi}.$$

$Z_{TRL}i$ is a value from the first time sequence, and $b_{Fzgi}$ is a value from the second time; and the acceptance of the output signal increases with an increase of the correlation coefficient.

10. The device according to claim 6, wherein the acceptance test comprises monitoring a correlation coefficient (R) representing a value calculated according to an equation $$R^2 = \frac{(S_{bz} - S_b * S_z/N)^2}{(S_{bb} - S_b * S_b/N) * (S_{zz} - S_z * S_z/N)}$$

wherein $$S_b = \sum_{i=1}^{N} b_{Fzgi}, \quad S_z = \sum_{i=1}^{N} Z_{TRLi}, \quad S_{bb} = \sum_{i=1}^{N} b_{Fzgi} * b_{Fzgi}$$

$$S_{zz} = \sum_{i=1}^{N} Z_{TRLi} * Z_{TRLi}, \quad S_{bz} = \sum_{i=1}^{N} b_{Fzgi} * Z_{TRLi}.$$

$Z_{TRLi}$ is a value from the first time sequence, and $b_{Fzgi}$ is a value from the second time; and the acceptance of the output signal increases with an increase of the correlation coefficient.

11. A device for determining a weight of a motor vehicle which is being moved by propulsive forces in its longitudinal direction, comprising:

a microprocessor;

a memory coupled to the microprocessor; and a sensing system coupled to the microprocessor; wherein the microprocessor has stored therein a program for causing the system continuously to detect, at successive points in time separated by regular periodic time intervals, measurement signals which correlate with said propulsive forces and with an associated vehicle longitudinal acceleration;

storing successively in the memory a first plurality of continuously detected measurement signals, said first plurality of signal forming in the memory a first time sequence for successive propulsive forces and a second time sequence for associated vehicle longitudinal accelerations;

reading out of said memory a second plurality of successively stored measurement signals from said first and second time sequences; and computing an output signal that correlates with a current weight of the vehicle based on said second plurality of successively stored measurement signals; wherein the microprocessor processes the second plurality of successively stored measurement signals read from the memory according to a regression calculation to generate said output signal;

the continuously recorded signals correlate with the propulsive force which is formed from a pulling or braking force acting on the vehicle, minus a rolling resistance and minus an air resistance;

the acceptance test comprises monitoring a correlation coefficient representing a value calculated according to the equation $$R^2 = \frac{(S_{bz} - S_b * S_z/N)^2}{(S_{bb} - S_b * S_b/N) * (S_{zz} - S_z * S_z/N)}$$

with $$S_b = \sum_{i=1}^{N} b_{Fzgi}, \quad S_z = \sum_{i=1}^{N} Z_{TRLi}, \quad S_{bb} = \sum_{i=1}^{N} b_{Fzgi} * b_{Fzgi},$$

$$S_{zz} = \sum_{i=1}^{N} Z_{TRLi} * Z_{TRLi}, \quad S_{bz} = \sum_{i=1}^{N} b_{Fzgi} * Z_{TRLi}.$$

$Z_{TRLi}$ being a value from the first time sequence, and $b_{Fzgi}$ being a value from the second time; and the acceptance of the output signal increases with an increase of the correlation coefficient.

12. The device according to claim 11, wherein a limiting value for the correlation coefficient is constantly calculated from previous acceptance signals and stored in the memory, and an evaluation of a currently generated output signal for the weight of the vehicle does not occur when the correlation coefficient is less than the limiting value.

13. The device according to claim 11, wherein the signal for the grade of the road represents a value calculated according to a system of equations, wherein $Z_{HAi} = Z_{TRLi} - m_{Fzg} * b_{Fzgi} = m_{Fzg} * g * \sin(s_i)$, wherein $Z_{HAi}$ is a descending force, g is an acceleration due to gravity, $m_{Fzg}$ is the output signal, $Z_{TRLi}$ is a value from the first time sequence, and $b_{Fzgi}$, is a value from the second time sequence and $s_i$ is a current grade of the road.

14. The device according to claim 13, wherein successive signals for the grade of the road are smoothed via low-pass filtration.

* * * * *